United States Patent [19]

Suzuki

[11] Patent Number: 5,117,317
[45] Date of Patent: May 26, 1992

[54] MAGNETIC TAPE RECORDING DEVICE WHICH POSITIONS THE BEGINNING OF THE MAGNETIC TAPE ADJACENT A RECORDING HEAD

[75] Inventor: Kenji Suzuki, Hamamatsu, Japan

[73] Assignee: Yamaha Corporation, Hamamatsu, Japan

[21] Appl. No.: 423,797

[22] Filed: Oct. 18, 1989

[30] Foreign Application Priority Data

Oct. 21, 1988 [JP] Japan .................... 63-137727[U]

[51] Int. Cl.$^5$ .............................................. G11B 15/48
[52] U.S. Cl. ................................ 360/74; 360/72.100; 360/15
[58] Field of Search ............... 360/13, 15, 71, 72.1, 360/72.3, 74.5, 74.6, 72.2, 74.1

[56] References Cited

U.S. PATENT DOCUMENTS 3,614,453  10/1971  Johnson .................... 360/74.6 X
4,553,180  11/1985  Hasegawa ..................... 360/74.4
4,866,547  9/1989   Rodal et al. .................. 360/74.2

FOREIGN PATENT DOCUMENTS 0071420  4/1986  Japan ............................ 360/74.4

OTHER PUBLICATIONS

IBM Technical Disclosure Bulletin vol. 23, No. 11, Apr. 1981, Self-Adjusting End of Tape/Beginning of Tape Optical Transducer Detection Circuit, Richards.

*Primary Examiner*—Andrew L. Sniezek
*Attorney, Agent, or Firm*—Spensley Horn Jubas & Lubitz

[57] ABSTRACT

A magnetic tape recording and playback device records or plays back a signal using a tape, in which a top portion thereof is connected to a leader tape which is non-magnetic substance. The device comprises a switch for setting an initial position, a detector provided on a tape running path for detecting that a tape portion at a point of detection is a boundary between a leader tape and a magnetic substance portion of the tape, a head provided on the tape running path to effect recording or playback on the tape, a mechanical portion for driving the tape to move along the tape running path, and a drive control circuit for controlling driving of the tape so as to drive the mechanical portion to rewind the tape when the switch has been operated and, upon detection of the boundary between the leader tape and the magnetic substance portion by the detector, stop driving of the tape in a state where the head is positioned in the vicinity of a top portion of the magnetic substance portion thereby to set the initial position.

5 Claims, 2 Drawing Sheets

MAGNETIC TAPE RECORDING DEVICE WHICH POSITIONS THE BEGINNING OF THE MAGNETIC TAPE ADJACENT A RECORDING HEAD

BACKGROUND OF THE INVENTION

This invention relates to a magnetic tape recording and playback device such as a magnetic tape cassette unit which, in a case where a top portion of a tape is connected to a leader tape, e.g., transparent tape or aluminum tape, is capable of starting playback or recording readily and quickly by operating an operation switch so as to set a magnetic head for recording and playing back automatically in an initial position in the vicinity of a top portion of a magnetic substance portion of the tape.

If recording is started from the starting end of the tape, a missing portion in recording will be caused due to existence of a leader portion of the tape which is connected before the magnetic substance portion on which recording can be made. To avoid occurrence of a missing portion in recording, a user had to drive or manually take up the tape while watching the tape driving state with his eyes to bring the top of the magnetic substance portion of the tape to a record position befor starting recording.

In the prior art device, the positioning of the top of the magnetic substance portion is troublesome and a user cannot cope with a case when recording must be started in a hurry, particularly in such a case when a broadcast singnal is to be recorded.

It is, therefore, an object of this invention to provide a magnetic tape recording and playback device capable of starting playback or recording readily and quickly by operating an operation switch for automatically setting an initial position of the magnetic head for recording in the vicinity of the top position of the magnetic substance portion of the tape.

SUMMARY OF THE INVENTION

For achieving the above object, the magnetic tape recording and playback device according to the invention comprises operation command means for setting a tape to an initial position state, boundary detection means provided on a tape running path for detecting that a tape portion at a point of detection is a boundary between a leader tape portion and a magnetic substance tape portion, a head portion provided on the tape running path to effect recording or playback on the tape, mechanical means for driving the tape to move along the tape running path, and drive control means for controlling driving of the tape so as to drive the mechanical means to rewind the tape when the operation command means has been operated and, upon detection of the boundary between the leader tape and the magnetic substance tape portion by the boundary detection means, stop driving of the tape in a state where the head portion is positioned in the vicinity of a top portion of the magnetic substance tape portion thereby to set the initial position.

According to the invention, by operating the operation switch for setting the initial position, the mechanical means is driven by the drive control means to rewind the tape, and upon detection of the boundary between the leader tape and the magnetic substance portion of the tape, the head is set in the initial position in the vicinity of the top of the magnetic substance portion of the tape. Accordingly, recording can be started immediately from this position.

A preferred embodiment of the invention will now be described with reference to the accompanying drawings.

BRIEF DESCRIPTION OF THE DRAWINGS

In the accompanying drawings.

DESCRIPTION OF A PREFERRED EMBODIMENT

Figure 1:
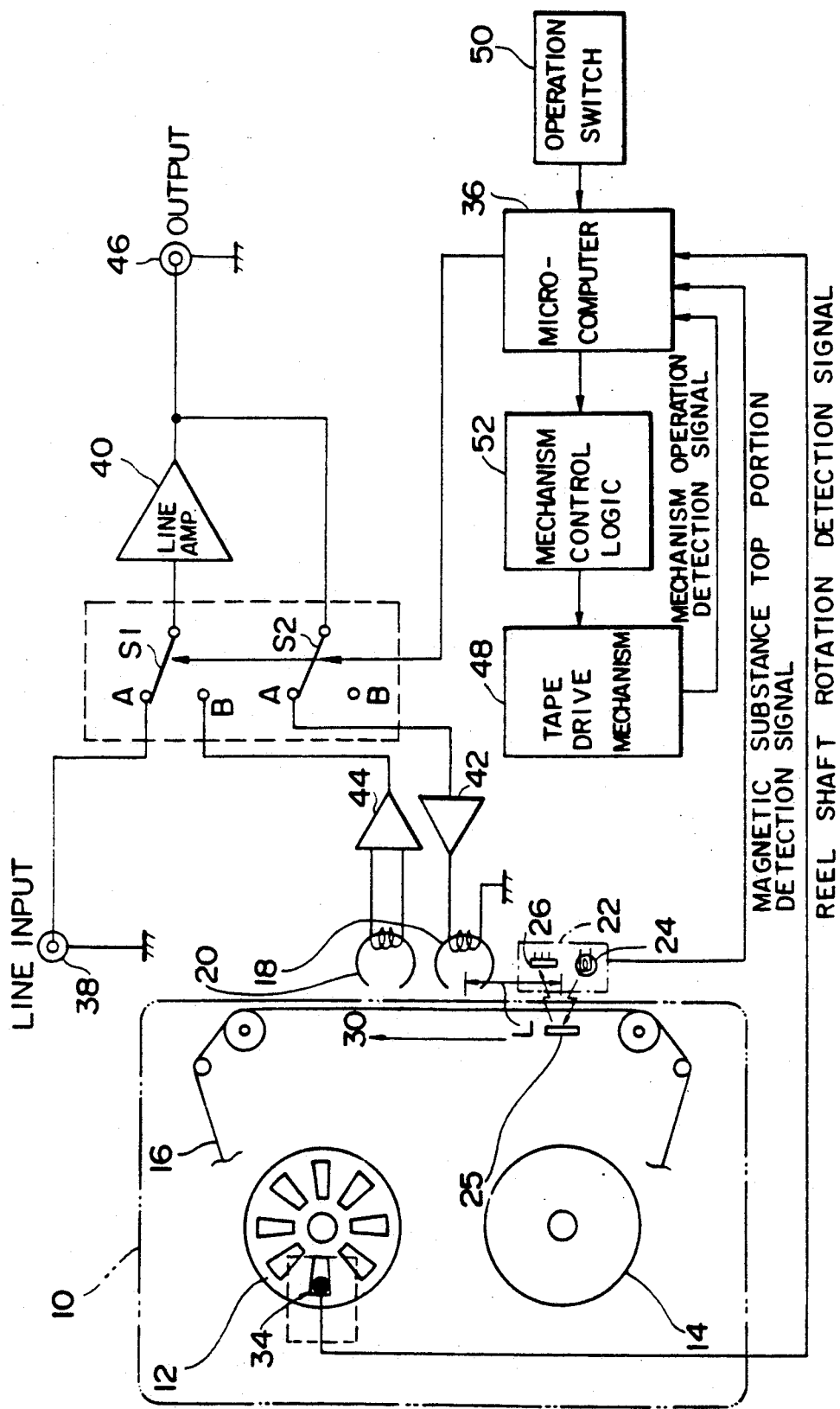
FIG. 1 is a block diagram showing an embodiment of the invention.

FIG. 1 shows an embodiment of this invention. A cassette tape 10 includes reels (not shown) set on a take-up reel turntable 12 and a supply reel turntable 14 of a magnetic tape cassette unit and a tape 16 is driven between these reels. There is provided a rotation detector 34 such as a photo-coupler on the take-up reel turntable 12.

The tape 16 consists of a magnetic substance portion and a transparent or semitransparent leader tape connected before the magnetic substance portion.

In the magnetic tape cassette unit, there are provided a recording head 18 and a playback head 20 on the opposite side of a front opening of the cassette tape 10. On the opposite side of a recording head 18, there is provided a photo-coupler 22 on the upstream side of recording and playback direction 30. The photo-coupler 22, which detects boundary of the leader tape and the magnetic substance portion, consists of a light-emitting diode 24 and a photo-transistor 26 provided on the surface side of the tape 16, and a mirror 25 on the back side of the tape 16.

When light is emitted from the light-emitting diode 24, it passes through the leader tape which is transparent or semitransparent, it is reflected by the mirror 25, and passes through the leader tape again to be received by the photo-transistor 26, whereas light emitted from the light-emitting diode 24 is intercepted by the magnetic substance portion which is opaque.

Accordingly, by detecting the change of state of light from the light-receiving state to the light-intercepted state, or the opposite, the boundery of the leader tape and the magnetic substance portion is detected. The mirror 25 can be located on the back side of the tape 10 by inserting it through an opening formed in the cassete tape, for example, a capstan insertion opening in which a capstan is not inserted. Instead of using the mirror 25, one of the light-emitting diode 24 and the photo transistor 26 may be arranged on the surface side of the tape, and the other on the back side of the tape.

Switches S1 and S2 are operated in a state interlocked with each other in accordance with a record/playback command given by a microcomputer 36. If they are respectively connected to a contact A-side, a signal applied from a line input terminal 38 is supplied from the switch S1 to a line amplifier 40 and then to an output terminal 46 and the switch S2, and from the switch S2 to an amplifier 42, and then to the recording head 18. If they are respectively connected to a contact B-side, an output signal from the playback head 20 is supplied from an amplifier 44 to the switch S2 and then to the output terminal 46.

A microcomputer 36 which controls the whole tape recorder, receives such signals as a reel shaft rotation detection signal produced by the rotation detector 34, a light receiving signal produced by the photo-coupler 22, a magnetic substance head portion detection signal, a mechanism operation detection signal from a tape drive mechanism 48, i.e. a signal from a limit switch or the like, and, an operation signal produced by an operation switch 50, and, based on these signals, controls driving of the tape drive mechanism 48 to perform a desired operation through a mechanism control logic 52.

Figure 2:
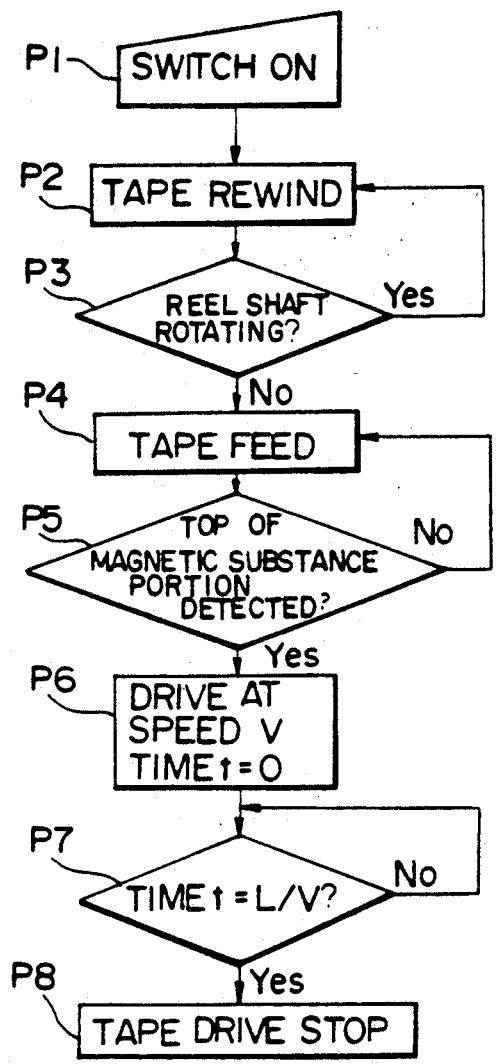
FIG. 2 is a flow chart showing an initial position setting operation in the magnetic tape recording and playback device of FIG. 1.

FIG. 2 shows an initial position setting operation by the tape recorder of FIG. 1. When an initial position setting key is depressed in the operation switch 50 (P1), the tape drive mechanism 48 is driven according to a command produced by the microcomputer 36 and the tape 16 is rewound up to the starting end. When it is detected by the rotation detection signal produced by the rotation detector 34 that the tape has stopped running, (P3), the tape is fed forward (P4). When the boundary between the leader tape and the magnetic substance portion of the tape has been detected by the photo-coupler 22 (P5), the tape 16 is forwardly fed further for a time length t (=L/V) at a speed V (P6, P7) in order to correct an amount of difference L between the recording head 18 and the photo-coupler 22, and then driving of the tape 16 is stopped (P8). The recording head 18 is thereby set in the initial position in the vicinity of the top of the magnetic substance portion of the tape. Accordingly, by starting recording in this state at a necessary timing, recording can be surely started from the vicinity of the top of the magnetic substance portion of the tape without a missing recording portion in the recording. The recording operation can be further simplified if in setting the initial position, state of a recording pause or a playbback pause is automatically set.

Figure 3:
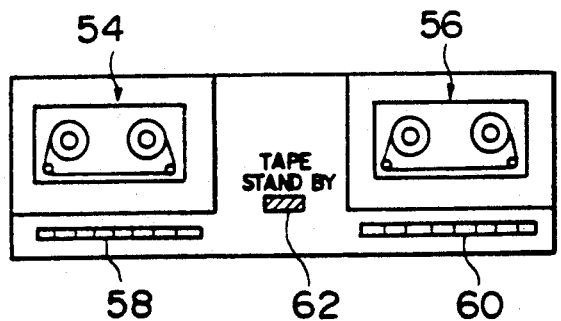
FIG. 3 is a diagram showing an example of providing an initial position settig key in a front panel of a double deck magnetic tape recording and playback device to which the device of FIG. 1 is applied.

An example of application in which the device of FIG. 1 is applied to a double deck magnetic tape recording and playback device will now be described. FIG. 3 shows an example of construction of a front panel in which are provided operation keys 58 and 60 at left and right decks respectively, as well as an initial position setting key 62 between these tape decks 54 and 56. There are also provided such parts for setting an initial position as the photo-coupler 22 on the right and left tape decks 54 and 56 respectively.

When the initial position setting key 62 is depressed, one of the decks, in which a tape has been set is operated for setting the initial position according to the procedure of FIG. 2. If tapes have been set in the both decks 54 and 56, they are both set in the initial position. Accordingly, in case of dubbing, by putting an original tape in one deck and a tape on which recording is to be in another deck, setting them in the initial position, and thereupon performing a playback operation for the original tape as well as a recording operation for the tape for dubbing simultaneously, the dubbing can be started without a missing portion in recording. Or, by providing a dubbing operation key, a series of operations including positioning of the tapes in the initial position, starting playback of the original tape, and starting recording of the tape for dubbing can be made automatically by simply depressing the key. In case of twin recording for effecting recording of information from an exterior source simultaneously on the both decks, 54 and 56, recording can be started by making recording operation simultaneously in the both decks after having set tapes in the decks 54 and 56 and set them in the initial position. In case of a relay recording, i.e., starting recording on a deck upon finishing recording on another deck, recording is made by putting tapes in the both decks 54 and 56, setting them in the initial position, thereupon effecting recording in one deck by making the recording operation, and when the recording has been finished, effecting recording on the other deck by making the recording operation.

In setting an initial position for playback in the embodiment of the invention, it is necessary to set a tape initial position not at a position of the recording head but at a position of a playback head.

In the embodiment of FIG. 1, although the photo-coupler 22 is located on the upstream side of the recording and playback direction with respect to the recording head 18, it can be located on the downstream side of the recording and playback direction (in case the magnetic tape recording and playback device is an auto-reverse deck, i.e., one in which the tape is driven for recording or playback in the reverse direction without replacing the tape, reverse running of the tape results in locating the photo-coupler 22 on the downstream side of the recording and playback direction). In this case, the boundary between the leader tape and the magnetic substance portion of the tape is detected after the top of the magnetic substance portion has passed by the recording head 18 and, therefore, the amount of difference between the recording head 18 and the photo-coupler 22 is corrected by rewinding the tape in reverse direction upon detection of the boundary. That is, if determining the difference amount is designated as L', and the rewind speed as V', the tape should be rewound for time length t'=L/V'. Additionally, in this case, upon detection of the boundary, driving of the tape may be stopped at this position, assuming this position as an initial position without rewinding the tape and recording can be started without a missing portion in recording.

In the embodiment of FIG. 1, initial position setting for the tape is made by rewinding the tape up to the starting point thereof and then driving it forward to detect the boundary of the leader tape and the magnetic substance portion of the tape. However, initial position setting can be made without rewinding the tape up to the starting end thereof, by stopping rewinding of the tape when the boundary is detected and then driving the tape forward fpr predetermined time so that an initial position can be set in the vicinity of the top of the magnetic substance portion.

In the embodiment of FIG. 1, the boundary of the leader tape and the magnetic substance portion is detected by the photo-coupler 22. However, the boundary can also be detected by the playback head 20. In this case, initial position setting is made, for example, by rewinding the tape up to the starting end thereof after depressing the initial position setting key, and starting playback with the playback head 20 pressed against the surface of the tape. If an output signal is detected (even if information is not recorded on the tape, a weak signal can be obtained), this signal is assumed to indicate the boundary, playback is stopped and the difference in position between the playback head 20 and the recording head 18 is corrected.

In the above embodiment, description has been made about the case where the leader tape is transparent or semi-transparent. In case that the leader tape is made of such material as an aluminum foil as in a videotape, and therefore is not light-conductive, a detection circuit may be provided according to the material of the leader tape, for example, by irradiating light on the tape, and detecting the boundary between the leader tape and the magnetic substance portion by detecting light reflected from the leader tape.

What is claimed is:

1. A magnetic tape recording and playback device comprising:

setting means for setting a tape to an initial starting position;

boundary detection means provided along a tape running path for detecting the transition boundary between a leader tape portion and a magnetic tape portion;

a magnetic recording a playback transducer provided along the tape running path to effect recording and playback on the tape, whereby said boundary detection means is disposed at least one of before and after said magnetic recording and playback transducer with respect to a direction of travel of the tape with a predetermined interval therebetween;

mechanical means for driving the tape to move along the tape running path; and drive control means for controlling driving of the tape so as to drive said mechanical means to rewind the tape when said setting means has been operated and upon detection of the transition boundary between the leader tape portion and the magnetic tape portion by said boundary detection means, stop driving of the tape in a state where the magnetic recording and playback transducer means is positioned in the vicinity of starting edge portion of the magnetic tape portion thereby to set the initial starting position, thereafter said drive control means drives the tape so that the tape is displaced forward, toward said transducer means, for a time length L/V, where L represents said predetermined interval and V represents speed of driving the tape, from a point at which said transition boundary has been detected by said boundary detection means.

2. A magnetic tape recording and playback device as defined in claim 1 wherein said leader tape portion is made of a non-magnetic substance.

3. A magnetic tape recording and playback device as defined in claim 2 wherein said boundary detection means comprises said playback transducer for playing back the tape and detects said boundary when a reproduced output during playback has exceeded a predetermined level.

4. A magnetic tape recording and playback device as defined in claim 1 including two tape driving portions, wherein said setting means includes a single operation command switch, said two tape driving portions being driven by respective mechanical means in response to operation of the setting means so as to set two tapes respectively mounted on said two tape driving portions to respective initial starting positions.

5. A magnetic tape recording and playback device as defined in claim 4 wherein, upon setting of the tapes to the initial starting position, one of said two tape driving portions performs a playback operation whereas the other performs a recording operation so as to record reproduced output from the tape in the tape drive portion executing the playback operation.

* * * * *